United States Patent
Chrisman, III

(10) Patent No.: US 7,803,058 B2
(45) Date of Patent: Sep. 28, 2010

(54) SCENTED BOWLING BALLS AND METHODS

(76) Inventor: John W. Chrisman, III, 193 W. 4050 North, Pleasant View, UT (US) 84414

(*) Notice: Subject to any disclaimer, the term of this patent is extended or adjusted under 35 U.S.C. 154(b) by 1063 days.

(21) Appl. No.: 09/832,141

(22) Filed: Apr. 9, 2001

(65) Prior Publication Data

US 2002/0147053 A1 Oct. 10, 2002

(51) Int. Cl.
*A63B 37/14* (2006.01)
(52) U.S. Cl. .................................. 473/125; 523/102
(58) Field of Classification Search .............. 473/125, 473/126, 127; 523/102
See application file for complete search history.

(56) References Cited

U.S. PATENT DOCUMENTS

| | | | |
|---|---|---|---|
| 3,567,119 A * | 3/1971 | Wilbert | |
| 4,226,944 A | 10/1980 | Stone et al. | |
| 4,293,602 A * | 10/1981 | Coffey et al. | |
| 4,513,014 A * | 4/1985 | Edwards | |
| 4,722,815 A * | 2/1988 | Shibanai | |
| 4,729,566 A | 3/1988 | Molitor | |
| 4,762,493 A * | 8/1988 | Anderson | |
| 4,808,272 A | 2/1989 | Molitor | |
| 4,920,172 A * | 4/1990 | Daoud | |
| 4,944,363 A | 7/1990 | Osher et al. | |
| 4,950,542 A * | 8/1990 | Barker | |
| 4,952,559 A * | 8/1990 | Login et al. | |
| 5,026,054 A | 6/1991 | Osher et al. | |
| 5,173,535 A * | 12/1992 | Abrutyn | |
| 5,865,372 A * | 2/1999 | Ceresko | |
| 5,944,912 A | 8/1999 | Jenkins et al. | |
| 6,090,774 A * | 7/2000 | Moscona et al. | |
| 6,203,470 B1 | 3/2001 | Lundin et al. | |
| 6,271,193 B1 * | 8/2001 | Sprecker et al. | |

OTHER PUBLICATIONS

CBT Resins: One-part & Two-part Systems (Cylclics Corporation) 2002, [online], [retrieved on Jun. 17, 2003] Retrieved from the Cyclics Corporation website <URL: http://www.cyclics.com/products/cbt_1_2_parts.html>.

One and Two-Part Resin Systems for Electronic & Industrial Potting Applications (Dymax Corporation) Aug. 2002.

Elmer's Probond Epoxy Glue (Elmer'S Brands) May 7, 2001, [online], [originally retrieved on Jun. 17, 2003] Retrieved from the Dick Blick Art Materials website <URL: http://www.dickblick.com/zz238/08/products.asp?param=0&ig_id=2576>.

(Continued)

*Primary Examiner*—William M Pierce
(74) *Attorney, Agent, or Firm*—TraskBritt

(57) ABSTRACT

A scented article of manufacture, such as a bowling ball, including a mass of polymeric material. The mass of polymeric material is substantially nonporous and may be substantially rigid. Polyurethane may be used as the polymeric material. A method by which the article of manufacture is formed includes blending fragrance with a liquid or liquified material, substantially removing gas and gas bubbles from the mixture of fragrance and liquid or liquified material, introducing the mixture into a cavity of a mold, and permitting or causing at least the liquid or liquified material within the cavity to cure.

29 Claims, 3 Drawing Sheets

OTHER PUBLICATIONS

CTL Two-Part Resin (CTL Components, PLC), [online], [retrieved Jun. 17, 2003] Retrieved from the CTL Components, PLC website <URL: http://www.ctl-components.com/aa_ea/009.html>.

Anchor Resin (LOGCO), [online], [retrieved Jun. 17, 2003] Retrieved from the Pick Quick Service Ltd. website <URL: http://www.pickquick.co.uk/logcoanchorresin.htm>.

Two-Part Sculpting Epoxies (Aves Studio) May 24, 2003, [online], [retrieved Jun. 17, 2003] Retrieved from the Wildlife Artist Supply Company (WASCO) <URL: http://www.taxidermy.net/wasco/cat/16/epoxy.html>.

Joints Stay Dry with Sleeves and Resin (CTL Components, PLC) Aug. 2, 2001, [online], [retrieved Jun. 17, 2003] Retrieved from the Electronicstalk website <URL: http://www.electronicstalk.com/news/ctl/ctl103.html>.

No Foolin' Around in April (Bowler's Journal) May 3, 2001 (earliest known date), [online], [originally retrieved Jun. 23, 2004] Retrieved from Bowler's Journal website <URL: http://www.bowlersjournal.com/instruction/pro_shop/9545.htm>.

The Gauntlet (Nu Line), [online], [retrieved Jul. 20, 2004] Retrieved from www.bowlingxxx.com <URL: http://www.bowlingxxx.com/NuLine%20Specs/Gauntlet.html>.

Intermediates & Polymer: Specialty Products: Terate(R) Polyols (KOSA) 1999, [online], [retrieved Apr. 7, 2003] Retrieved from the KOSA website <URL: http://www.kosa.com/poly/specprod.htm>.

About Polyols (Synair Corporation) 2002, [online], [retrieved Apr. 7, 2003] Retrieved from the Synair Corporation website <URL: http://polyol.synair.com/About%20Polyols.htm>.

"One Part Epoxy Resin," Three Bond Technical News, vol. 19, pp. 1-10, Oct. 1, 1987.

Oleesky, Samuel S., et al., Handbook of Reinforced Plastics, pp. 1-75 and 208-209, Von Nostrand Reinhold Company, New York, 1964.

* cited by examiner

SCENTED BOWLING BALLS AND METHODS

BACKGROUND OF THE INVENTION

1. Field of the Invention

The present invention relates generally to bowling balls and to methods for manufacturing bowling balls. In particular, the present invention relates to scented or fragrant bowling balls, as well as to methods for fabricating such bowling balls. The present invention also relates to other articles of manufacture that include substantially rigid, nonporous, scented rubber or rubber-like material.

2. Background of Related Art

Conventionally, bowling balls have been formed from machinable, thermosetting plastic materials. A typical bowling ball that meets the criteria that have been set by the American Bowling Congress (ABC) has an outside diameter of between 8.500 and 8.595 inches, providing such a bowling ball with a circumference of about 27 inches. In addition, ABC standards require that a bowling ball be within 0.010 of an inch of a spherical shape. The Women's International Bowling Congress (WIBC) has also set size limitations for balls used by members competing in its events.

The materials from which bowling balls may be formed may be substantially homogeneous, forming a solid, substantially unitary structure. Alternatively, a bowling ball may include a core or one or more other weighted members that are formed from a material or materials that differ from the material of the outer shell thereof Typically, the materials from which a core or any other weighted members are formed have a greater densities than the outer shell of such a bowling ball.

Polyurethanes are an example of a material from which bowling balls or the outer shells thereof may be formed. Polyurethanes are polymers that are typically produced by reacting a polyisocyanate, sometimes referred to as an "A-side," with a material that includes alcohol groups, which is known in the art as a hydroxyl-containing material and is sometimes referred to as a "B-side" of the polyurethane. Examples of B-side materials that may be used to produce polyurethane include the polyols that are derived from propylene oxide and from trichlorobutylene oxide. In a so-called "polycondensation reaction," where a polymer and water, alcohol, or another simple molecule are the products, the A- and B-side molecules combine to form the polyurethane. The following chemical equation illustrates the basic reaction between the A-side (R'NCO) and the B-side ($R_2OH$) to form polyurethane:

where R and RN are each hydrocarbons.

In use, bowling balls are subjected to the often objectionable smells of a bowling alley, including cigarette smoke, sweat, and shoe odors. After use, bowling balls are often placed into a bag that includes other items, such as gloves, supports, or braces that are used in bowling, as well as bowling shoes. Thus, even when stored, bowling balls are often exposed to somewhat objectionable odors. Further, bowling bags are sometimes stored in the trunks of cars, which may carry other undesirable smells.

Unfortunately, polyurethane, from which bowling balls are typically manufactured, as well as other materials that may be used in the manufacture of bowling balls, often possess some capacity to absorb the odors to which they are exposed. Moreover, some bowlers find the smells of the materials from which bowling balls are made objectionable. In some instances, the scents of such materials may even cause physical reactions, such as nausea or headaches.

In use, a bowler typically positions a bowling ball in close proximity to his or her nose, where the often objectionable smells carried by the bowling ball become readily apparent to the bowler.

Accordingly, there is a need for bowling balls and other articles of manufacture with pleasant scents, as well as for methods for manufacturing such articles.

SUMMARY OF THE INVENTION

The present invention includes scented bowling balls and methods for manufacturing scented bowling balls. Other scented articles of manufacture that are formed from substantially nonporous rubber or rubber-like materials are also within the scope of the present invention, as are methods for fabricating these articles of manufacture.

The size and weight of a scented bowling ball incorporating teachings of the present invention are preferably within the specifications that have been set by one or both of the American Bowling Congress and the Women's International Bowling Congress, although bowling balls of other dimensions and weights, including child-sized bowling balls, and toy bowling balls are also within the scope of the present invention. A bowling ball according to the present invention is formed from a substantially nonporous, substantially rigid rubber or rubber-like material, such as polyurethane, that has fragrance dispersed at least partially therethrough. Other articles of manufacture that are within the scope of the present invention include one or more components that are similarly formed from a substantially nonporous rubber or rubber like material with fragrance dispersed at least partially therethrough.

In the method of the present invention, fragrance is added to a liquid precursor material and mixed therewith, preferably to homogeneity. Accordingly, it is preferred that the fragrance be compatible with the liquid precursor material. For example, if the liquid precursor material is hydrophobic (i.e., "water-hating" or oil-based), the use of a hydrophobic fragrance is preferable. Alternatively, if the liquid precursor material is hydrophilic (i.e., "water-loving" or water- or alcohol-based), a hydrophilic fragrance may be used. In the example of forming a polyurethane structure, a hydrophilic, or water-based fragrance may be mixed with a fraction of the polyol portion of the polyurethane. The amount of fragrance in the liquid precursor may then be diluted by adding more of the liquid precursor to the mixture.

Once the liquid precursor includes an amount, or concentration, of fragrance that will provide a final product with the desired scent, the liquid precursor material may be cured. In the case of the formation of a polyurethane structure, the polyol liquid precursor material may be cured by adding isocyanate, a catalyst. Preferably, the isocyanate and polyol are quickly blended with one another to form a homogeneous mixture, then introduced, or cast, into a mold. The material is then cured or permitted to cure for a length of time and by one or more processes that depend, at least in part, upon the type of material that is being used to form the article of manufacture.

Upon adequate curing of the nonporous, hard rubber or rubber-like material, so-called "finishing" processes may be conducted to further define the article of manufacture from the scented, substantially nonporous, hard rubber or rubber-like material.

Other features and advantages of the present invention will become apparent to those of ordinary skill in the art through consideration of the ensuing description, the accompanying drawings, and the appended claims.

BRIEF DESCRIPTION OF THE DRAWINGS

In the drawings, which illustrate exemplary embodiments of various aspects of the present invention.

DETAILED DESCRIPTION OF THE INVENTION

An exemplary embodiment of the present invention, in which a scented bowling ball is formed from polyurethane, is depicted in FIGS. 1-6.

Figure 1:
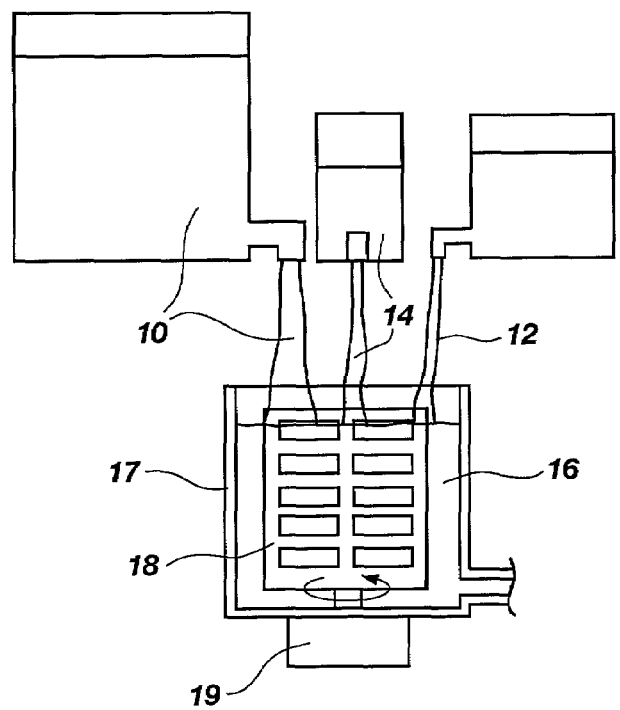
FIG. 1 is a schematic representation of a process by which a fragrance may be mixed with a liquid precursor material to a hard rubber or rubber-like material, which will be used in to form an article of manufacture.

In FIG. 1, a mixture 16, including a quantity of a liquid polyol 10, which is a precursor material that is also referred to herein as a "B-side" of a polyurethane, and a quantity of a fragrance 12 is formed. Mixture 16 may also include a quantity of pigment 14.

Liquid polyol 10 may be any known type of liquid polyol (e.g., a polyester polyol, a polyether polyol, etc.) that is useful in forming polyurethane. Preferably, polyol 10 is suitable for use in forming substantially rigid, nonporous polyurethane, such as is used in forming bowling balls and other solid articles of manufacture. For example, the liquid polyol available from HK Research, Inc. of Hickory, N.C., as product no. VCB 1275 may be used in a method incorporating teachings of the present invention to form polyurethane having the desired characteristics.

When polyurethane is being used to manufacture an article such as a bowling ball, fragrance 12 may be either water-based or oil-based. Due to the high hydrocarbon and hydroxyl contents of polyols, both water-based and oil-based fragrances 12 may at least partially dissolve in polyol 10. It is preferred that fragrance 12 comprise a material such as an ester, a terpene, an aldehyde, a ketone, or any combination thereof Any portion of fragrance 12 that does not dissolve in polyol 10 may be dispersed therethrough and maintained in suspension by blending polyol 10 and fragrance 12 just prior to or as the A-side isocyanate 22 (FIG. 4) is blended with mixture 16. HK Research manufactures an exemplary isocyanate under the designation VCA 1100.

Figure 4:
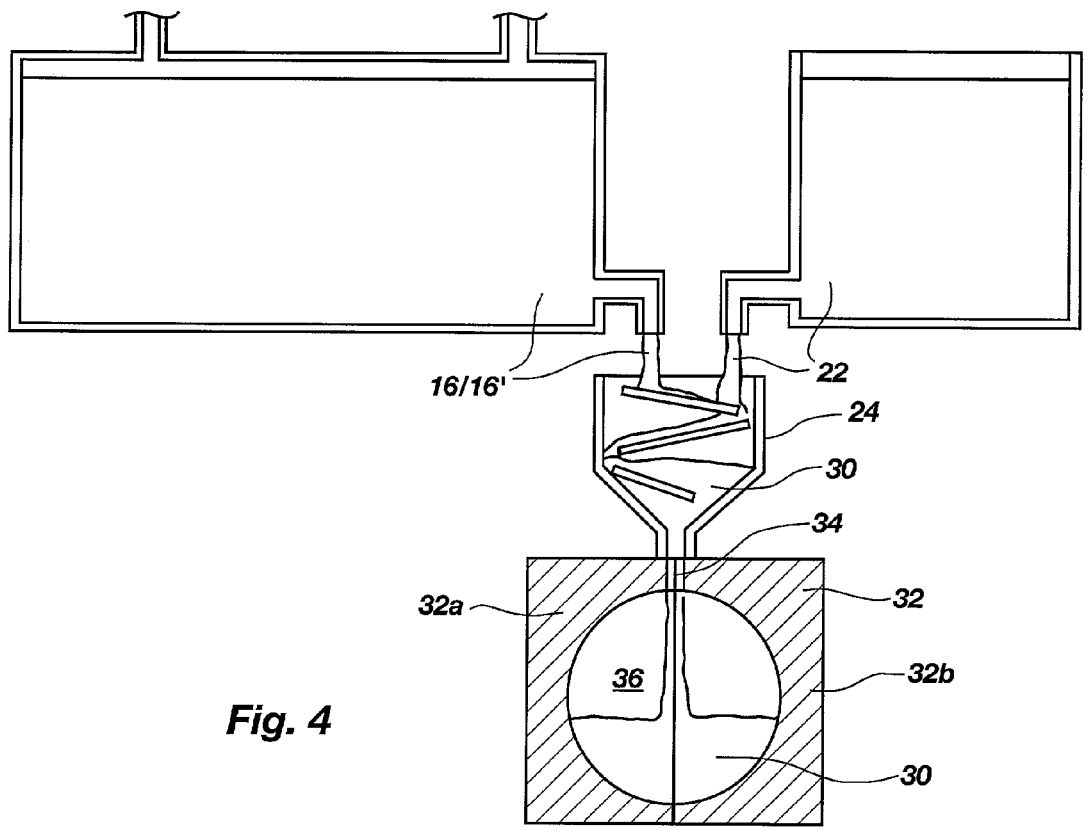
FIG. 4 schematically represents introduction of the mixture of FIG. 3 and a catalyst that facilitates curing of at least the liquid precursor material through a static mix element and into a mold.

In addition, if mixture 16 includes a pigment 14, it is preferred that fragrance 12 be compatible with pigment 14, as well as any other materials that are added to mixture 16, including any catalyst or A-side, such as isocyanate 22 (FIG. 4). It is also preferred that fragrance 12 does not chemically react with polyol 10, pigment 14, isocyanate 22, or any other materials that are included in a final polymer blend 30 (FIG. 4) in a manner that will inhibit a polymerization reaction between polyol 10 and isocyanate 22 or otherwise undesirably alter the characteristics of a finished article of manufacture 40 (FIG. 6) or in a manner that will substantially mask the aroma given off by fragrance 12. Further, it is preferred that fragrance 12 be stable at temperatures to which both mixture 16 and final polymer blend 30 will be subjected.

The amount of fragrance 12 that is added to polyol 10 may depend upon the strength of scent that is desired for finished article of manufacture 40 (FIG. 6), the desired duration for which finished article of manufacture 40 retains the aroma of fragrance 12, any masking of the aroma of fragrance 12 by the scent of or reaction of fragrance 12 with one or more of the other materials of mixture 16 or final polymer blend 30 (FIG. 4), other factors, or combinations thereof. The strength of the aroma given off by fragrance 12 may be determined, at least in part, by one or more of the type of fragrance 12 that is used, the aroma of fragrance 12, the type of material or materials in which fragrance 12 is dissolved or dispersed, and the aroma of the material or materials in which fragrance 12 is dissolved or dispersed. Of course, since more materials will be added to mixture 16, the fragrance 12 may be much more concentrated in mixture 16 than in a final polymer blend 30. Accordingly, the amount of fragrance 12 that is included in mixture 16 is determined on the basis of the desired fragrance 12 concentration in final polymer blend 30 rather than the concentration of fragrance 12 in mixture. By way of example only, fragrance 12 may comprise up to about five percent, by weight, of the combination of polyol 10 and fragrance 12 in final polymer blend 30. In one embodiment, the concentration of fragrance 12 in a polyol 10 and fragrance 12 mixture is about seventeen pounds of fragrance 12 for every 900 pounds of polyol 10, which amounts to a concentration of about 2%, by weight, of the combination of polyol 10 and fragrance 12.

Fragrance 12 may have any type of aroma, including, without limitation, the scents of fruits, mint, herbs, and the like. The scent of fragrance 12 may or may not correspond to the color of the finished bowling ball or other article of manufacture. By way of example only, fragrance 12 could be selected to impart a purple article of manufacture 40 (FIG. 6) with a grape or violet (flower) scent; a green article of manufacture 40 with a sour apple or wintergreen scent; a red article of manufacture 40 with a cherry, watermelon, raspberry, rose, or cinnamon scent; a yellow article of manufacture 40 with a lemony smell; a blue article of manufacture 40 with a blueberry or peppermint scent; an orange article of manufacture 40 with the fragrance of an orange, etc. Fragrances 12 that are typically associated with aromatherapy and deodorizing, and other scents may also be used, as may combinations of fragrances 12 having different scents.

If included in mixture 16, a selected pigment 14 imparts a polyurethane article of manufacture 40 (FIG. 6), such as a bowling ball, with its color. As with fragrance 12, pigment 14 may be either water-based or oil-based and preferably dissolves substantially within the B-side polyol 10. The amount of pigment 14 that is blended with polyol 10 depends upon the desired intensity of the finished product. Of course, since additional polyol 10 may subsequently be added to mixture 16 and isocyanate 22 (FIG. 4) will be added to mixture 16, the concentration of pigment 14 in mixture 16 is relatively high compared to the concentration of pigment 14 in final polymer blend 30 (FIG. 4).

In an exemplary process for forming mixture 16, an initial quantity of polyol 10, along with desired quantities of fragrance 12 and pigment 14 may be added to a dispersing tank 17. Fragrance 12 and pigment 14 may then be blended into polyol 10 of mixture 16 by known processes. For example, dispersing tank 17 may have a mixing blade 18 of a known type therein, as well as a motor 19 associated with mixing blade 18, as known in the art, to rotatably drive mixing blade 18. Preferably, the force with which polyol 10, fragrance 12, and pigment 14 are blended is adequate to form a substantially homogenous mixture 16 without introducing an undesirable amount of gas into mixture 16 and without forming an undesirable number of gas bubbles within mixture 16.

Figure 2:
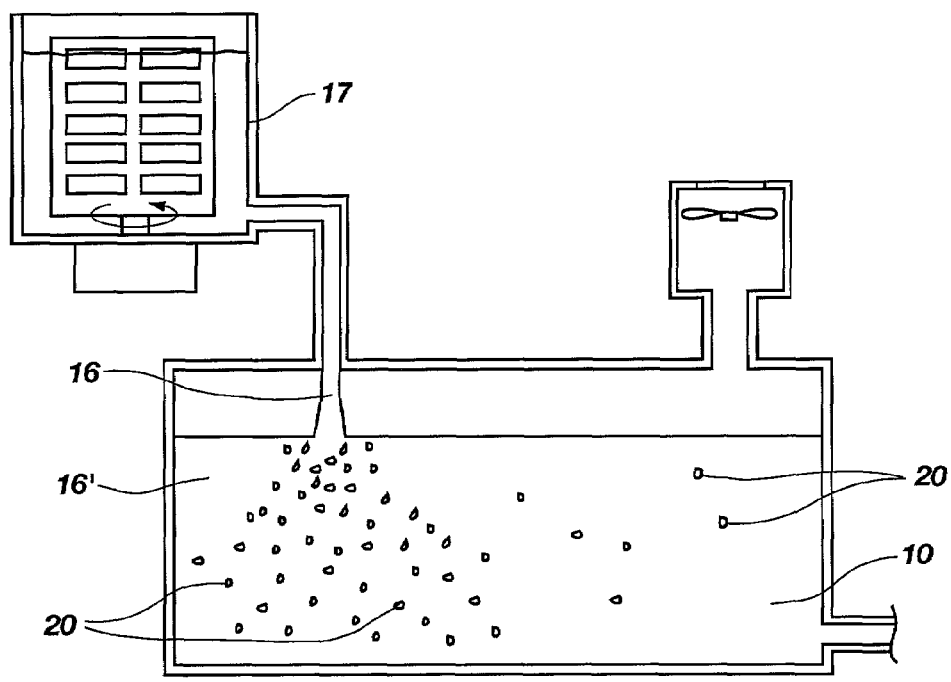
FIG. 2 schematically illustrates the addition of more liquid precursor material to the mixture shown in FIG. 1 to decrease the concentration of, or dilute, the fragrance.

As shown in FIG. 2, once the components of mixture 16 have been blended, mixture 16 may be added (e.g., by way of dispersing tank 17) to an additional quantity of polyol 10 to form a secondary mixture 16' in which the concentration or concentrations of fragrance 12 and pigment 14, if any, are diluted. Of course, if mixture 16 is added to an additional quantity of polyol 10 as depicted in FIG. 2, mixture 16 and polyol 10 may be blended with one another to form a substantially homogeneous secondary mixture 16'.

Figure 3:
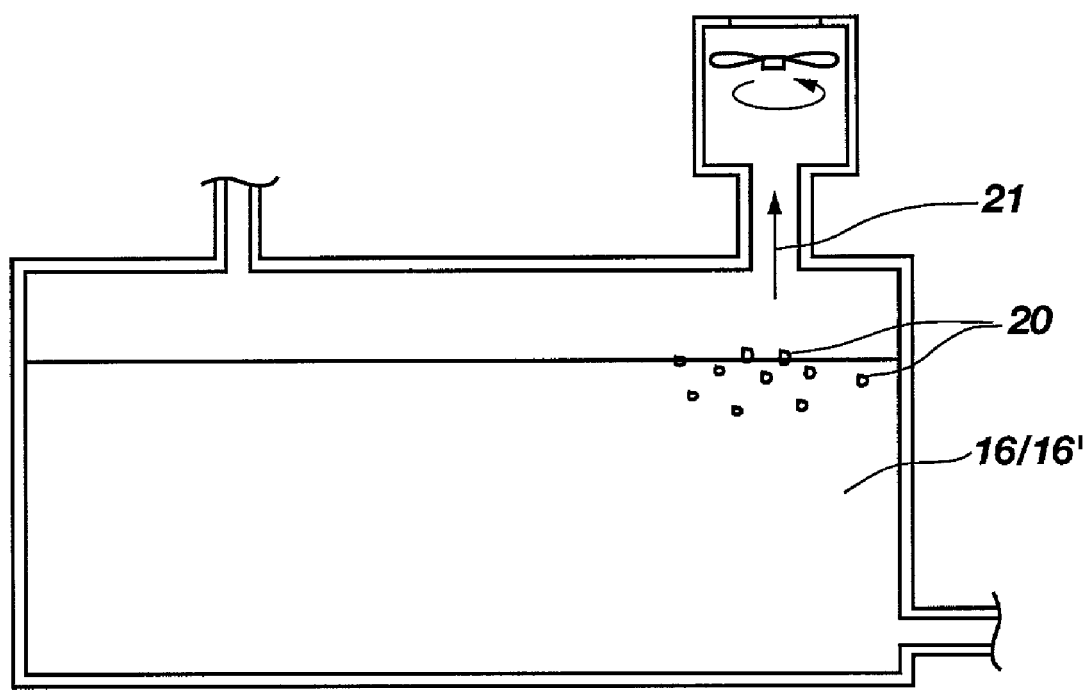
FIG. 3 is a schematic representation of the application of a vacuum to the mixture of either FIG. 1 or FIG. 2 to substantially remove gas and gas bubbles therefrom.

FIG. 3 depicts the removal of any gas or gas bubbles 20 from mixture 16 or secondary mixture 16'. Although FIG. 3 shows the application of a vacuum 21 to mixture 16, 16' to remove gas or gas bubbles 20 therefrom, any known techniques that are suitable for causing gas and gas bubbles to escape a liquid, such as mixture 16, 16', without facilitating undesirable effects (e.g., degradation of one or more of the components of mixture 16, 16', an undesired reaction between components of mixture 16, 16' that would not otherwise occur, an undesirable alteration of one or more of the components of mixture 16, 16', etc.) may be employed.

Figure 6:
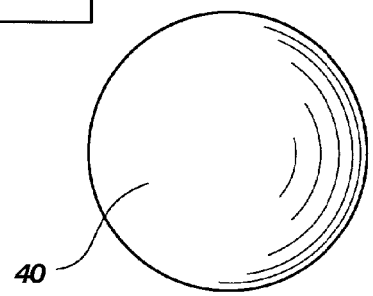
FIG. 6 is a perspective view of a finished bowling ball.

Referring now to FIG. 4, mixture 16, 16' is blended with an appropriate A-side of the polyurethane, or polymerization catalyst, in this case an isocyanate 22, to form a final polymer blend 30. The amount of isocyanate 22 that is blended with mixture 16, 16' depends upon the desired hardness of the finished article of manufacture 40 (FIG. 6). Preferably, about 50 to about 100 parts, by volume, of isocyanate 22 are blended with 100 parts, by volume, of polyol 10 to form final polymer blend 30. Thus, final polymer blend 30 may have a concentration, by volume, of about 50 to about 70 percent polyol 10 and of about 30 to about 50 percent isocyanate 22.

As shown in FIG. 4, these materials may be introduced substantially concurrently through a static mix element 24 of a known type and blended with one another thereby. Nonetheless, any known processes and equipment that are suitable for mixing the A- and B-sides of polyurethane may be used in the present embodiment of the inventive method. The force with which mixture 16, 16' and isocyanate 22 are blended is preferably sufficient to quickly (i.e., before a substantial amount of polymerization occurs) form a substantially homogeneous mixture without substantially introducing gas or gas bubbles into final polymer blend 30. In addition to creating a substantially homogeneous mixture of polyol 10 and isocyanate 22, blending of final polymer mixture 30 by static mix element 24 or otherwise disperses any undissolved components, such as fragrance 12, pigment 14, or other components (e.g., metal flakes, etc.) to a desired degree throughout final polymer blend 30.

With continued reference to FIG. 4, as the substantially homogeneous final polymer blend 30 exits static mix element 24, final polymer blend 30 is introduced, or poured or cast, into one or more cavities 36 of one or more molds 32 through channels 36 that are formed between the top of each mold 32 and each cavity 36 thereof. Cavities 36 are shaped and dimensioned so as to form an article of manufacture 40 (FIG. 6) having the desired shape and dimensions. As depicted, cavities 36 of molds 32 are spherical in shape and have dimensions that are useful for forming bowling balls from final polymer mixture 30 upon polymerization or curing of the same. Each mold 32 preferably includes at least two separable portions 32a and 32b to facilitate the removal of articles of manufacture 40 (FIG. 6) from each cavity 36.

Figure 5:
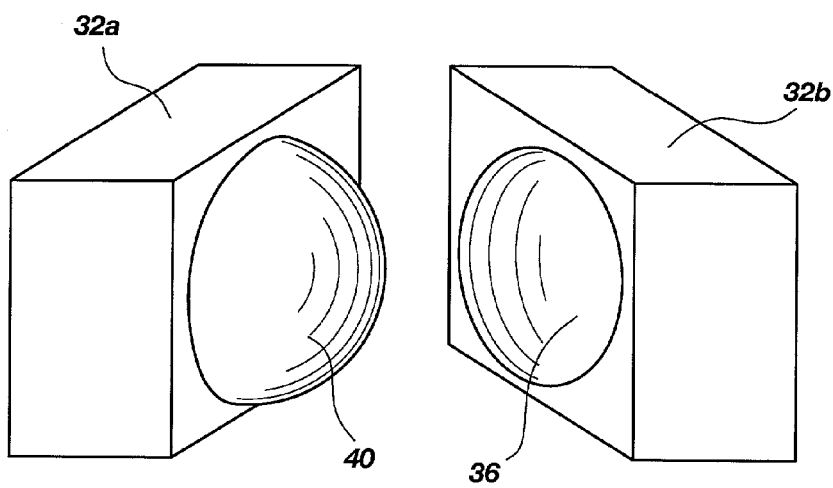
FIG. 5 is a schematic representation of the removal of an article of manufacture, in this case a bowling ball, from the mold of FIG. 4.

When final polymer blend 30 has been introduced into cavities 36 of molds 32, isocyanate 22 and polyol 10 are permitted to polymerize, or cure, solidify, or gel, forming an article of manufacture 40 within each cavity 36 of mold 32. For example, final polymer blend 30 may be permitted to gel for about two minutes or longer before article of manufacture 40 is removed therefrom, as depicted in FIG. 5. The polymerization reaction between isocyanate 22 and polyol 10 of final polymer blend 30 is exothermic, or heat generating. This exothermic reaction may cause final polymer blend 30 and mold 32 to be heated to temperatures as high as about 300° F. or greater.

The material of article of manufacture 40 is permitted to cure for an additional period of time (e.g., a few hours or overnight). As article of manufacture 40 cures, it may also shrink somewhat, preferably to substantially a desired size for the finished article of manufacture 40 (FIG. 6). Upon curing to a sufficient degree, finishing processes may be conducted on article of manufacture 40, as known in the art. When article of manufacture 40 is a bowling ball, finishing processes including lathing to remove any irregularities from the surface thereof, engraving, and polishing may be conducted thereon.

Referring now to FIG. 6, a finished article of manufacture 40 incorporating teachings of the present invention is preferably a substantially nonporous structure. Article of manufacture 40 may also be substantially rigid. When article of manufacture 40 is a bowling ball, as is depicted, the size and weight of the bowling ball are preferably within the specifications that have been set by one or both of the American Bowling Congress and the Women's International Bowing Congress, although bowling balls of other dimensions and weights, including child-sized bowling balls and solid and hollow toy bowling balls, are also within the scope of the present invention.

When fragrance 12 (FIG. 1) is dissolved within, dispersed substantially throughout, or otherwise embedded in the material of article of manufacture 40, the aroma of fragrance 12 may be continuously and gradually released from article of manufacture 40 over periods of time reaching about a year or more. Consequently, fragrance 12 may mask odors that may be absorbed into the material of article of manufacture 40, as well as those of the material or materials of article of manufacture 40. Fragrance 12 may also cause the material of article of manufacture 40 to resist absorption of such odors.

Although FIG. 6 depicts the finished article of manufacture 40 as being a bowling ball, the present invention includes other scented articles of manufacture. Moreover, while the method of the present invention has been described in terms of forming a polyurethane article of manufacture 40, scented, substantially nonporous articles of manufacture 40 incorporating teachings of the present invention may also be formed from different types of materials, as well as by alternative methods. When article of manufacture 40 is a bowling ball, it may have a harness, or durometer, of about 72 Shore D to about 77 Shore D. Of course, other types of articles of manufacture may have different hardnesses.

For example, an article of manufacture 40 of the present invention, such as a bowling ball, may be formed from a thermosetting resin, in which case a suitable fragrance is dissolved in or dispersed throughout a quantity of liquid thermosetting resin, the thermosetting resin introduced into a cavity of an appropriate mold, and heat and/or pressure applied to the thermosetting resin within the mold cavity to cure the same.

As another example, a suitable fragrance may be mixed with a quantity of a suitable thermoplastic resin (which is typically commercially available in a pellet form) either before or after heat and/or pressure are applied to the thermosetting resin to liquify the same. A mixture including at least the liquified thermosetting resin and fragrance is then introduced into a cavity of an appropriate mold and permitted to solidify.

When the finished article of manufacture 40 is a bowling ball, as illustrated in FIG. 6, the bowling ball may or may not include internal or external weighted members that influence the manner in which the bowling ball rolls down a lane.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A bowling ball, comprising:
   a mass comprising a two-part resin; and
   a fragrance at least partially dissolved in at least a portion of said two-part resin of said mass.

2. The bowling ball of claim 1, wherein said mass is substantially nonporous.

3. The bowling ball of claim 1, wherein said mass is substantially rigid.

4. The bowling ball of claim 1, wherein said two-part resin comprises polyurethane.

5. The bowling ball of claim 1, wherein said fragrance is dispersed throughout at least said portion of said two-part resin.

6. The bowling ball of claim 1, wherein said fragrance comprises up to about 2% of the weight of the bowling ball.

7. The bowling ball of claim 1, further comprising a pigment, wherein a scent of said fragrance correlates with a color of a pigment of or in said two-part resin.

8. A method for manufacturing a bowling ball, comprising:
   providing a liquid material;
   blending at least one fragrance directly into said liquid material;
   introducing said liquid material and said at least one fragrance into a cavity of a mold; and
   curing said material with said at least one fragrance therein.

9. The method of claim 8, wherein said providing said liquid material comprises providing a polyol.

10. The method of claim 9, wherein said introducing includes introducing an isocyanate into said cavity with said liquid material and said at least one fragrance.

11. The method of claim 10, wherein said introducing includes mixing said polyol and said isocyanate.

12. The method of claim 8, wherein said blending comprises dissolving said at least one fragrance in said liquid material.

13. The method of claim 8, wherein said blending comprises dispersing said at least one fragrance throughout said liquid material.

14. The method of claim 8, wherein said curing comprises permitting said liquid material to harden.

15. The method of claim 8, wherein said curing comprises introducing a polymerization catalyst for said liquid material into said cavity with said liquid material and said at least one fragrance.

16. The method of claim 15, wherein said providing said liquid material comprises providing a polyol.

17. The method of claim 16, wherein said introducing said polymerization catalyst comprises providing an isocyanate.

18. A method for manufacturing a bowling ball, comprising:
   providing a polyol;
   blending at least a fragrance directly into said polyol;
   substantially removing gas or gas bubbles from a mixture including said polyol and said fragrance;
   introducing said mixture and a polymerization catalyst therefor into a cavity of a mold; and
   permitting a blend including said polyol and said polymerization catalyst therefor to at least partially polymerize to form a bowling ball.

19. The method of claim 18, wherein said blending at least said fragrance comprises dissolving at least one fragrance in said polyol.

20. The method of claim 18, wherein said blending at least said fragrance comprises dispersing at least one fragrance throughout said polyol.

21. The method of claim 18, wherein said introducing includes blending said polyol and said polymerization catalyst therefor.

22. The method of claim 18, wherein said introducing said polymerization catalyst includes introducing isocyanate into said cavity with said polyol.

23. The method of claim 18, further comprising removing the article of manufacture from said cavity.

24. The method of claim 23, further comprising removing irregularities from the article of manufacture.

25. A bowling ball, comprising:
   a substantially rigid, substantially nonporous spherical mass comprising a two-part resin and configured as a bowling ball; and
   fragrance at least partially dissolved within at least a portion of said two-part resin.

26. The bowling ball of claim 25, wherein at least a portion of said fragrance is dispersed throughout said two-part resin of at least a portion of said substantially nonporous spherical mass.

27. The bowling ball of claim 25, wherein said two-part resin comprises a two-part polyurethane.

28. The bowling ball of claim 25, further comprising a pigment.

29. The bowling ball of claim 28, wherein a scent of said fragrance correlates with a color of said pigment.

* * * * *